United States Patent
Rowny et al.

(10) Patent No.: US 10,206,071 B2
(45) Date of Patent: Feb. 12, 2019

(54) MMS DELIVERY SYSTEM

(71) Applicant: Google LLC, Mountain View, CA (US)

(72) Inventors: Andrew Rowny, San Francisco, CA (US); Shishir Kumar Agrawal, Sunnyvale, CA (US); Ji Yang, Mountain View, CA (US); Cheuksan Edward Wang, Campbell, CA (US); Abhijith Shastry, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/160,450

(22) Filed: May 20, 2016

(65) Prior Publication Data

US 2016/0345145 A1 Nov. 24, 2016

Related U.S. Application Data

(60) Provisional application No. 62/165,069, filed on May 21, 2015.

(51) Int. Cl.
*H04W 4/12* (2009.01)
*H04W 4/14* (2009.01)
*H04W 4/18* (2009.01)
*H04W 88/02* (2009.01)

(52) U.S. Cl.
CPC ............. *H04W 4/14* (2013.01); *H04W 4/12* (2013.01); *H04W 4/185* (2013.01); *H04W 88/02* (2013.01)

(58) Field of Classification Search
CPC .......... H04W 4/14; H04W 4/12; H04W 4/185
USPC ................................................. 709/206, 207
See application file for complete search history.

(56) References Cited

U.S. PATENT DOCUMENTS

| | | | | |
|---|---|---|---|---|
| 2008/0280633 | A1* | 11/2008 | Agiv | G06F 17/214 455/466 |
| 2010/0124196 | A1* | 5/2010 | Bonar | H04B 7/0689 370/329 |
| 2014/0342761 | A1 | 11/2014 | Kolodziej | |

OTHER PUBLICATIONS

"Sending MMS Notifications and Content," Now.SMS, archived Nov. 7, 2010 by archive.org, available at https://web.archive.org/web/20101107083511/https://www.nowsms.com/doc/submitting-sms-messages/sending-mms-notifications-and-content (Year: 2010).*
"SMS URL Parameters," Now.SMS, archived Nov. 12, 2010 by archive.org, available at https://web.archive.org/web/20101112221459/http://www.nowsms.com/doc/submitting-sms-messages/url-parameters (Year: 2010).*
"Definition of SMS Push," Now.SMS, 2004, available at https://support.nowsms.com/discus/messages/12/5003.html (Year: 2004).*

(Continued)

*Primary Examiner* — David Orange
(74) *Attorney, Agent, or Firm* — Fish & Richardson P.C.

(57) ABSTRACT

In one implementation, a computer-implemented method includes: receiving, at a computer system, a multimedia message service (MMS) message for delivery to a client computing device; storing, by the computer system, the MMS message; generating, by the computer system, a traditional short message service (SMS) message including a notification that the MMS message is available for download from the computer system; transmitting, by the computer system, the SMS message to the client computing device; receiving, after transmitting the SMS message, a request from the client computing device to download the MMS message; and sending, by the computer system, the MMS message to the client computing device.

18 Claims, 11 Drawing Sheets

(56) References Cited

OTHER PUBLICATIONS

NowSMS NowSMS, "Sending MMS Notifications and Content," May 2, 2015, pp. 1-3, XP055285005, Retrieved from the Internet: URL:https://web.archive.org/web/20150502052112/http://www.nowsms.com/doc/submittingsms-messages/sending-mms-notifications-and-content, [retrieved on Jun. 30, 2016].
NowSMS NowSMS, "Quick Start Guide—Now SMS/MMS Gateway," Jul. 20, 2014, pp. 1-45, XP055285011 Retrieved from the Internet: URL:https://web.archive.org/web/20140720061842/http://www.nowsms.com/download/nowsmsquickstartguide.pdf, [retrieved on Jun. 30, 2016].
International Search Report and Written Opinion in International Application No. PCT/US2016/033482, dated Jul. 8, 2016, 12 pages.

* cited by examiner

MMS DELIVERY SYSTEM

CROSS-REFERENCE TO RELATED APPLICATIONS

This application claims priority to U.S. Provisional Application Ser. No. 62/165,069, filed on May 21, 2015, the entire contents of which are hereby incorporated by reference.

TECHNICAL FIELD

This document generally describes technology related to delivering messages, such as MMS.

BACKGROUND

Mobile computing devices, such as smartphones and cellular telephones, can send and receive text messages through communication networks, such as text messages sent through a short message service (as called "traditional SMS" herein) and multimedia messages sent through a multimedia message service (MMS). For example, mobile computing devices can be notified that an MMS message is available for download via a wireless application protocol (WAP) push. In response to receiving a WAP push, the mobile computing device can be prompted to request the MMS message for download from a server system storing the MMS message.

Mobile computing devices can run applications, such as mobile applications ("mobile apps"), to transmit and receive text messages. For example, users can install mobile apps to send and receive text messages on a mobile computing device over IP network connections, which can also be referred to as "over the top" (OTT) transmission of text messages. In another example, mobile devices can run applications, sometimes factory installed, to send and receive text messages over PSTN connections.

SUMMARY

This document describes devices, systems, and techniques that can be used to notify a mobile computing device that messages, such as MMS messages, are available for the device to download. For example, a messaging system can receive an MMS message for a mobile computing device, and send a traditional SMS message (not special SMS, like WAP push) to notify the mobile computing device that the MMS message is available. The mobile computing device can be programmed to identify the SMS message as a notification that the MMS message is available and, in response to receiving the SMS message, to retrieve the MMS message from the messaging system. The mobile computing device may generate a traditional MMS notification, such as a WAP push, and insert it into its local messaging system to prompt the download of the MMS message. Additionally, the mobile computing device can be programmed to discard the SMS notification after the MMS retrieval process has begun so that, for example, users are not shown the SMS notification.

In one implementation, a computer-implemented method includes the steps of receiving, at a computer system, a multimedia message service (MMS) message for delivery to a client computing device; storing, by the computer system, the MMS message; generating, by the computer system, a traditional short message service (SMS) message including a notification that the MMS message is available for download from the computer system; transmitting, by the computer system, the SMS message to the client computing device; receiving, after transmitting the SMS message, a request from the client computing device to download the MMS message; and sending, by the computer system, the MMS message to the client computing device.

In another implementation, a computer-implemented method comprises the steps of receiving, at a client computing device, a first SMS message from a messaging system, determining, by the client computing device, that the first SMS message comprises a notification that an MMS message is available for the client computing device, generating, by the client computing device and in response to the determining, a wireless application protocol (WAP) push notification that identifies the MMS message, injecting, by the client computing device, the WAP push notification into a platform layer on the client computing device, wherein injecting the WAP push notification causes a messaging application on the client computing device to request download of the MMS message, requesting, in response to the messaging application requesting download of the MMS message, the MMS message from the messaging system, and receiving, at the client computing device, the MMS message.

Certain implementations including those described above may provide one or more advantages. For example, the disclosed technology can allow for mobile devices to be notified of MMS messages without having to rely upon WAP push notifications. WAP pushes are special SMS that can have interoperability issues across various carriers and systems, and can render WAP push notifications unreliable. For instance, special routing situations (e.g., home routing, roaming traffic, MVNOs, etc.) can cause WAP push notifications to be delayed and/or to go undelivered. Notifying a mobile computing device that an MMS is available via traditional SMS can avoid such problems associated with WAP push notifications.

In another example, using traditional SMS to notify a mobile computing device of an MMS message can allow for the MMS message to be downloaded outside of traditional carrier frameworks which can require particular authentications, such as SIM authenticating. For example, using traditional SMS messages as notifications can allow for alternate authentication mechanisms (e.g., social network login) for some or all MMS messages to be downloaded.

In a further example, the reliability of MMS can be enhanced. Also the can increase an ability to share resources that may be filtered, such as by an access control list, by something other than the network (e.g., company or social login).

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document generally describes technology for using a traditional SMS message to notify a mobile computing device that an MMS message is available for download to the mobile device and for prompting the mobile computing device to download the MMS message. For example, the carrier app paradigm on mobile computing device, such as those running ANDROID, can be used to intercept a regular SMS message with enough details about the MMS message (e.g. to/from information) to construct the WAP push from the device side. The device-side WAP push can be reinserted into the platform, a default messaging app (e.g., an SMS app, an MMS app) can pick-up the device-side WAP push, and the default messaging app can be prompted to retrieve the MMS from a system storing the MMS. For instance, using particularly programmed MMS APIs, the platform can request that a carrier app download the MMS message, where a non-network based authentication scheme (e.g., GAIA) can be used to authenticate the user as having access and can then manage downloading the MMS message.

A variety of features can be included. For example, WAP push notifications can be assembled client side, so as to alleviate potential interoperability issues. Notification SMS messages can be filtered and de-duplicated, which can allow for more redundant delivery of MMS messages, such as over IP and multiple carrier networks, which can provide for more robust MMS delivery. Carrier apps can use a different authentication scheme for making sure a user/mobile computing device is on an access control list (ACL) for the MMS message.

Figure 1:
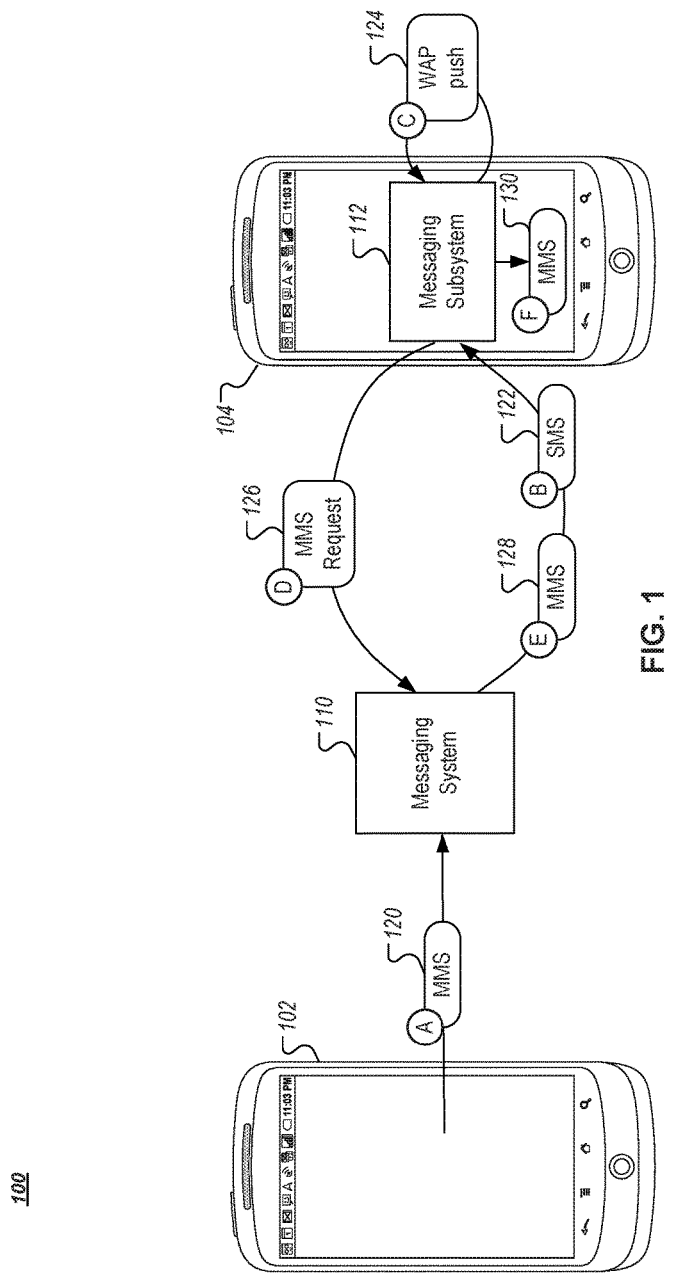
FIG. 1 is a conceptual diagram that depicts an example system in which a traditional SMS message is used to prompt a mobile computing device to download a pending MMS message.

FIG. 1 is a conceptual diagram that depicts an example system 100 in which a traditional SMS message is used to prompt a mobile computing device to download a pending MMS message. The system 100 includes a sender mobile computing device 102 that sends an MMS message, as indicated by step A, to a recipient mobile computing device 104. The example computing devices 102 and 104 can be any of a variety of appropriate computing devices, such as smartphones, cell phones, tablet computing devices, wearable computing devices, embedded computing devices, and/or non-mobile computing devices. The MMS messages (and other communications) can be transmitted over any of a variety of appropriate communication channels, such as a PSTN and/or an IP network.

As indicated by step A (120), the mobile computing device 102 sends an MMS message, such as through a PSTN or IP network connection that is being used by the computing device 102. The MMS message can be routed to a messaging system 110 that is associated with the computing device 104. For example, a carrier (not depicted) that is associated with the computing device 104 can be configured to route messages for the computing device 104 to the messaging system 110, which can process the messages and deliver the messages to the computing device 104 over any of a variety of multiple communication channels.

The messaging system 110 can be programmed to receive MMS messages and, in response to receiving the MMS messages, to generate a traditional SMS message to notify mobile devices of the pending MMS message. For example, as depicted in step B (122), the messaging system 110 can transmit an SMS message to the mobile computing device 104 that notifies the mobile computing device 104 of the pending MMS message from the mobile computing device 102. The messaging system 110 can generate and insert any of a variety of details in the SMS message to prompt the computing device 104 to retrieve the MMS message, such (1) a distinct identifier (e.g., a particular sender identifier, a string of characters in the message) to flag the SMS message as an MMS notification, (2) an identifier for the MMS message (e.g., a sender identifier, a unique identifier for the message) that the mobile computing device 104 can use to request the MMS, and/or (3) an identifier for the messaging system 110.

The computing device 104 includes a messaging subsystem 112 that is programmed to handle receipt, processing, and retrieval of the MMS message based on the SMS notification. In particular, the messaging subsystem 112 is programmed to identify the SMS message as an MMS notification, to generate an appropriate device-side WAP push, and to insert the WAP push into the local messaging system on the device 104, as indicated by step C (124). The WAP push can be routed to a messaging application that is part of the messaging subsystem 112, which can automatically request the MMS message from the messaging system 110 in response to receiving the WAP push, as indicated by step D (126). The messaging subsystem 112 can include one or more of a radio layer on the device 104, a platform layer on the device 104, a messaging account application installed on the device 104, and a messaging application installed on the device 104. Such components can work in concert to generate/insert the WAP push and to request the MMS message, as described with regard to FIGS. 2-4 below.

In response to receiving the MMS message request, the messaging system 110 can identify an MMS message corresponding to the request and can transmit it to the mobile computing device 104, as indicated by step E (128). The MMS message can be received by the messaging subsystem 112 of the mobile computing device 104, and can be inserted into one or more data structures or layers that are accessed by applications (e.g., text messaging applications, social networking applications, media applications) on the mobile computing device 104, as indicated by step F (130).

Figure 2:
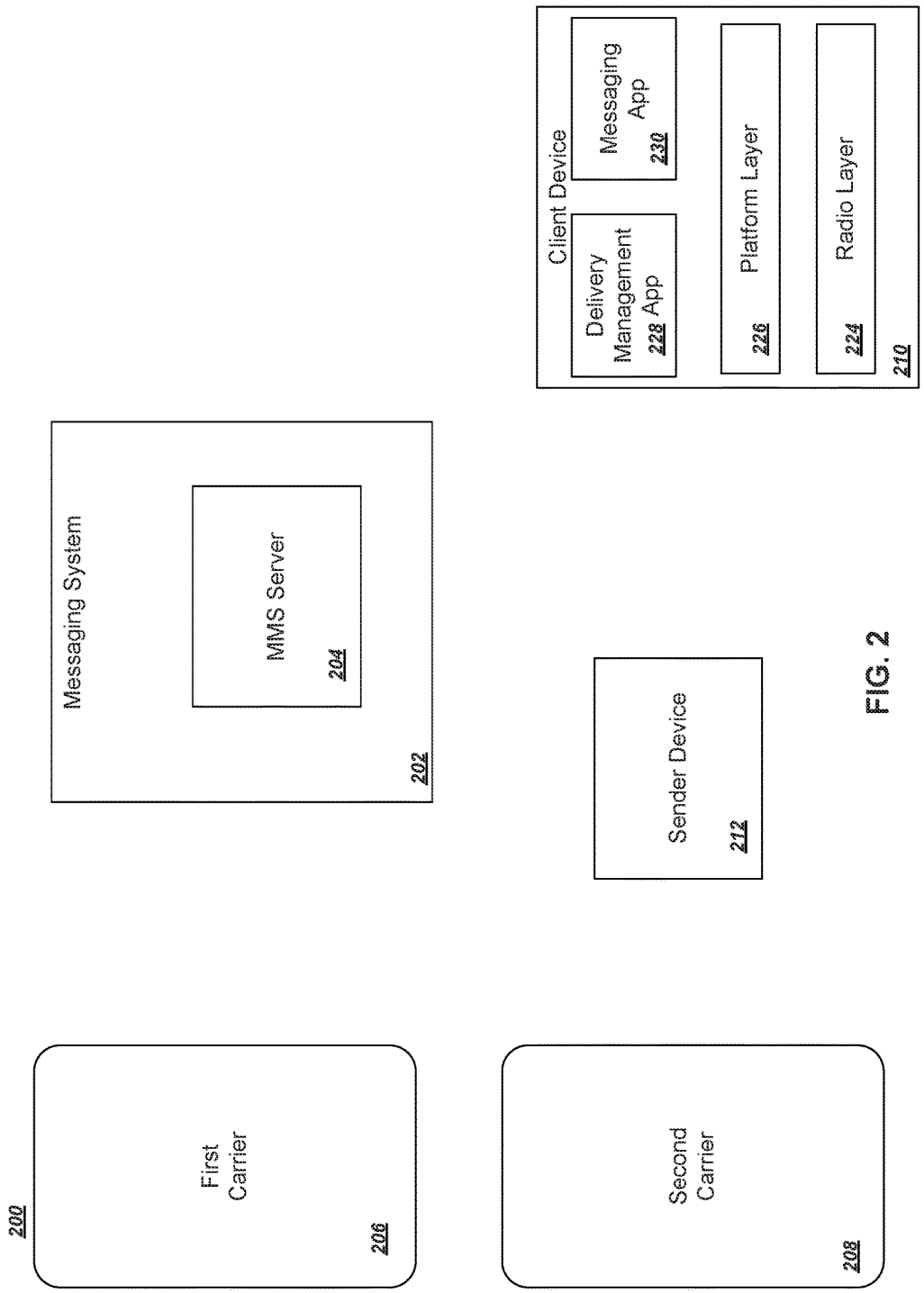
FIG. 2 depicts an example system for transmitting MMS notifications through SMS messages.

FIG. 2 depicts an example system 200 for transmitting MMS notifications through SMS messages. The example system 200 includes a messaging system 202, example first and second carriers 206-208, a (recipient) client device 210, and a sender client device 212. The example system 200 can implement the MMS delivery described above with regard to FIG. 1.

The message system 202 is programmed to manage sending and receiving messages over multiple communication channels, such as PSTN and IP networks. The message system 202 can include any of a variety of components, such as an MMS server 204 that handles incoming/outgoing MMS exchanges with the carriers 206-208 and/or the client devices 210-212.

The first and second carriers 206-208 can be telecommunication carriers that provide access to PSTNs. In the depicted example, the first carrier 206 can be a primary carrier for the messaging system 202, and can be publicly visible for phone numbers for client devices using the services of the messaging system 202, such as the client device 210. The example second carrier 206 can be part of another network onto which client devices of the messaging system 202 can roam, for example by using a different SIM profile.

The client device 210 can be any of a variety of appropriate device, such as the computing device 104. The example client device 210 includes a radio layer 224 that handles sending/receiving bits over a wireless PSTN network; a platform layer 226 that holds system APIs available to apps and messaging databases (e.g., an SMS database) that messaging apps can read from and write to; a delivery management app 228 that can be a carrier app that has special system API permissions; and a messaging app 230 that can provide a user interface through which users can send, receive, and output messages (e.g., SMS, MMS) on the client device.

The interaction of the components of the example system 200 depicted in FIG. 2 to send and receive MMS messages is depicted and described with regard to FIGS. 3A-E and 4.

FIGS. 3A-E depict transmission of an incoming MMS message using the example system 200 described in FIG. 2. The steps described across FIGS. 3A-E correspond to the incoming message delivery described above with regard to FIG. 1.

Figure 3A:
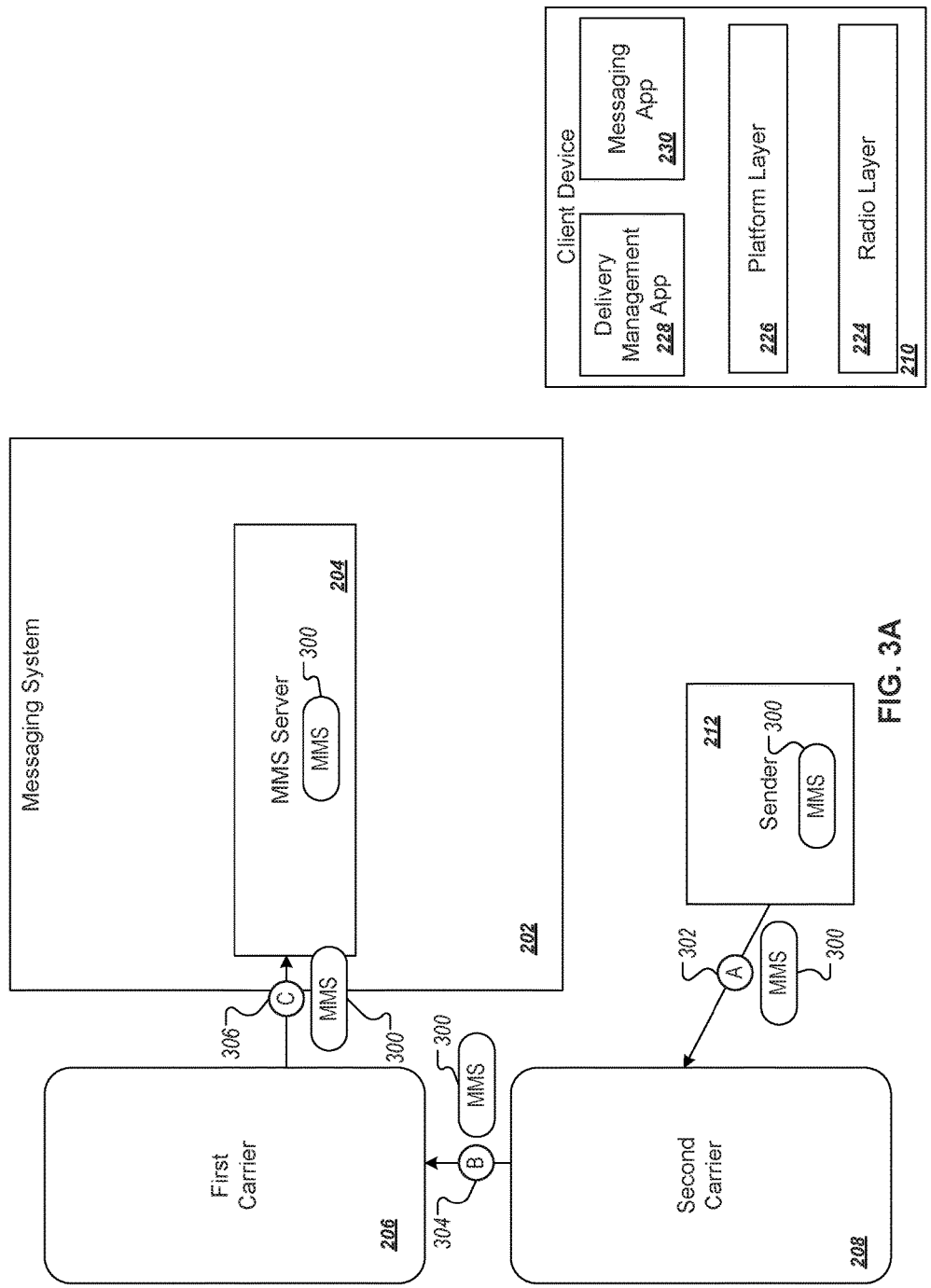
FIGS. 3A-E depict transmission of an incoming MMS message using the example system described in FIG. 2.

Referring to FIG. 3A, a user of the sender device 212 (other client computing device) enters an MMS message 300 and hits send, which causes the message 300 to be transmitted by the sender device 212 to the second carrier 208 that is associated with the sender device 212, as depicted in step A (302). The sender's carrier (second carrier 208) looks up the recipient (example client device 210) number in a central database and identifies that it is associated with the first carrier 206 and forwards to the message 300 to the first carrier 206, as indicated by step B (304). The first carrier 206 recognizes that the recipient number is associated with the messaging system 202 and passes the message 300 to the MMS server 204 of the messaging system 202, as indicated by step C (306). The MMS server 204 can store the MMS message 300. steps A-C (302-306) cover delivery of a message to the messaging system 202 from a device 212 that is not associated with the messaging system 202. Messages sent by devices that are associated with the messaging system 202 may be delivered to the first carrier 206 and/or the messaging system 202 directly.

Figure 3B:
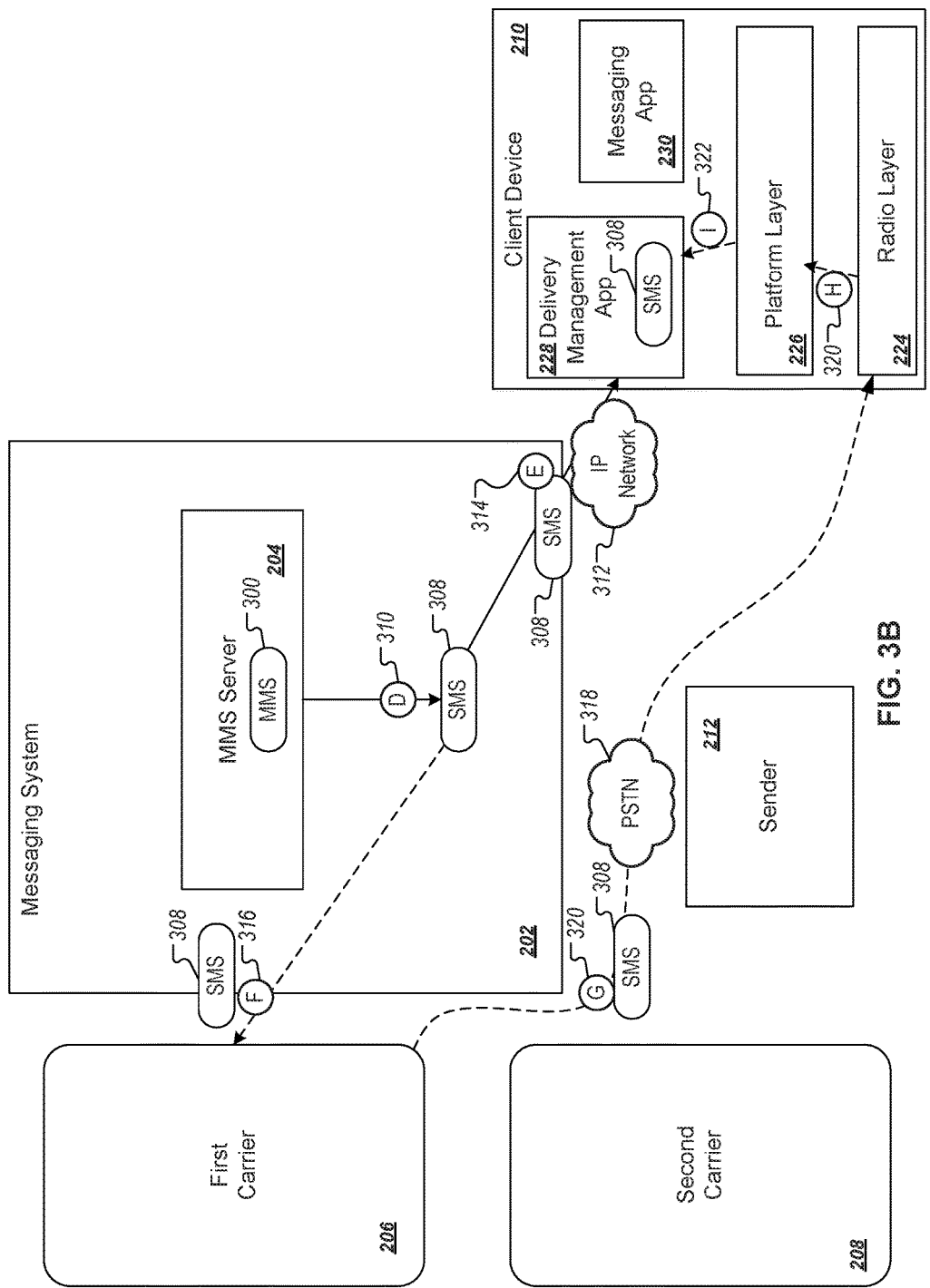

Referring to FIG. 3B, a traditional SMS message 308 with information providing notification of the MMS message 300 is generated, as indicated by step D (310) by the messaging system 202 and transmitted over an IP network 312 (e.g., the internet, local area network (LAN), wide area network (WAN), virtual private network (VPN), mobile data networks, or any combination thereof) to the delivery management app 228 on the client device 210, as indicated by step E (314). For example, the messaging system 202 can look up an IP identifier (e.g., GCM ID) associated with the recipient phone number for the client device 210. Alternatively (and/or additionally), in instances where the client device 210 does not have a connection over the IP network 312, the messaging system 202 can deliver the SMS message 308 over a PSTN communication channel, as depicted in steps F-G. For example, the messaging system 202 can send the SMS message 308 to the first carrier 206, as indicated by step F (316), which can transmit the SMS message 308 over a PSTN 318 to a radio layer 224 of the client device 210, as indicated by step G (320). Once the SMS message 300 gets to the client device 210, it is inserted into the message database in the platform layer 226, as indicated by step H (322) and, once inserted into the platform layer 226, the SMS message 300 can be picked up by the delivery management app 228, as indicated by step I (324).

Figure 3C:
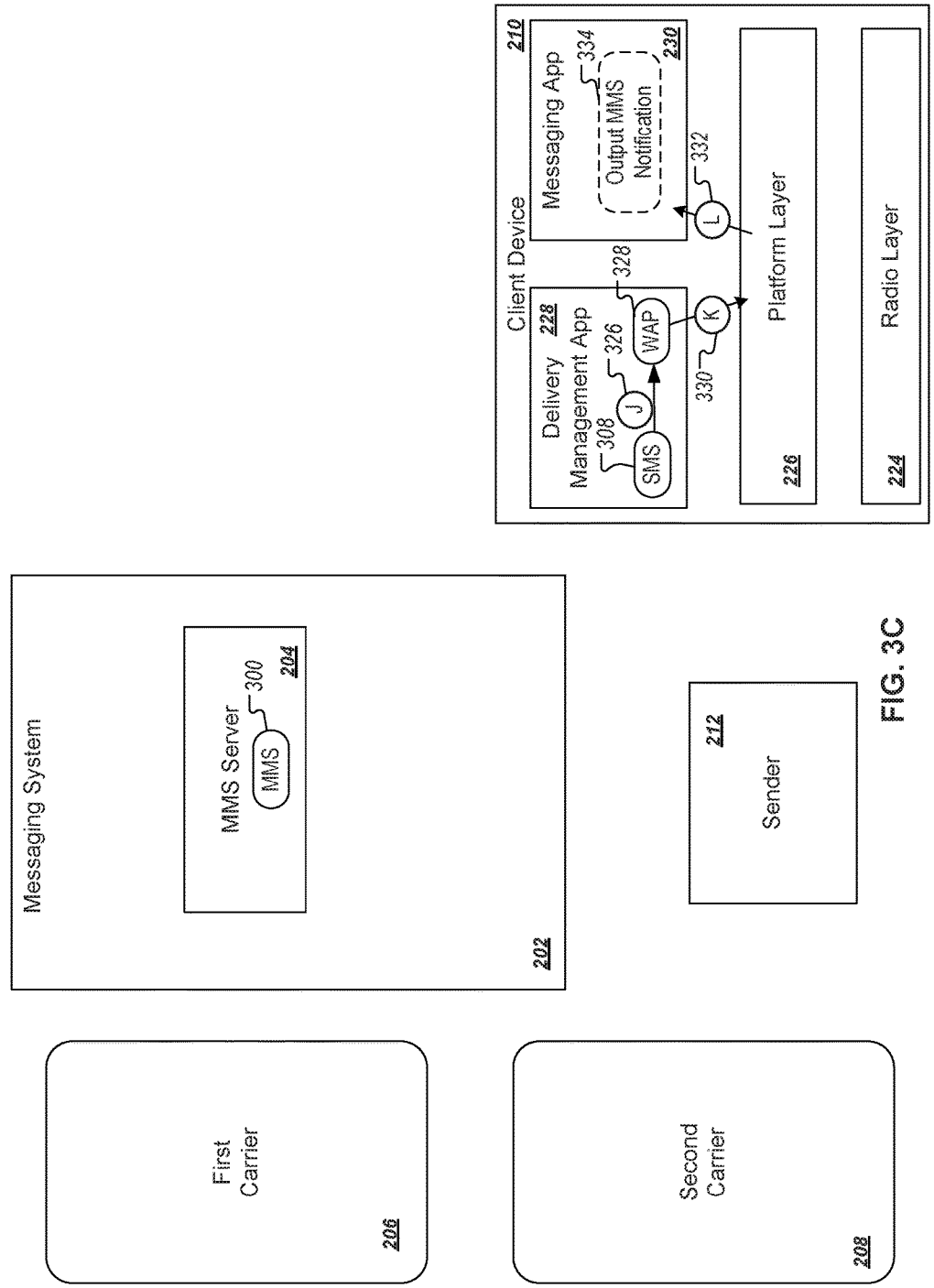

Referring to FIG. 3C, the delivery management app 228 converts the SMS message 308 (providing notification of the MMS 300 for the client device 210 on the MMS server 204) into a WAP push message 328, as indicated by step J 326. The WAP push message 328 can be formatted in, for example, protocol development unit (PDU) mode—meaning that it is treated as binary data (e.g., hexadecimal values) instead of as readable text. The delivery management app 228 can inject the WAP push 328 into the platform layer 226, as indicated by step K (330), and the WAP push 328 can be then picked up by the messaging app 230, as indicated by step L (332). In some implementations, the messaging app 230 can output (e.g., display) a notification that the MMS message is being received and pending download to the client device, as indicated by the output notification 334.

Figure 3D:
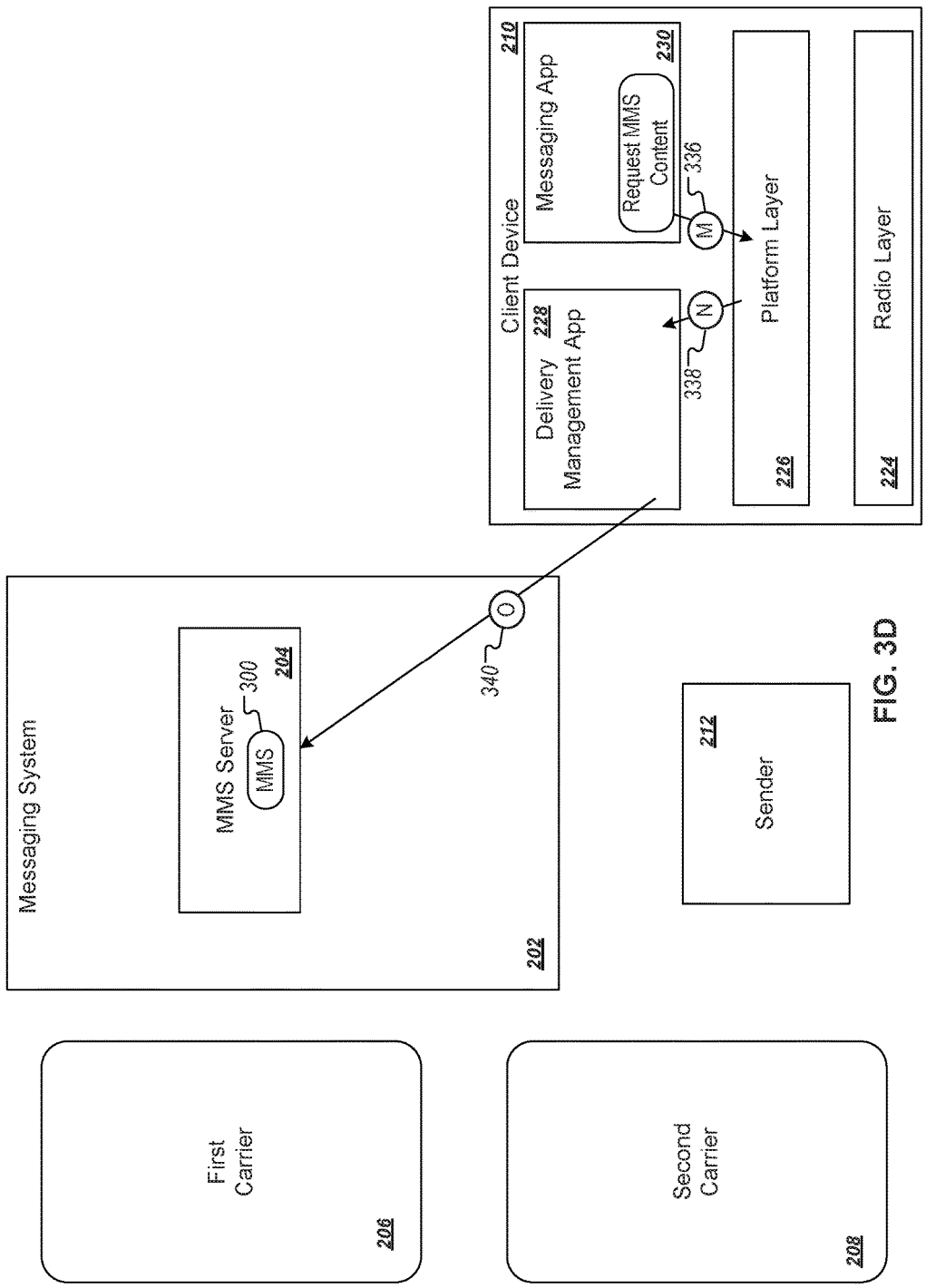

Referring to FIG. 3D, using, for example, particularly programmed MMS APIs, the messaging app 230 can request the platform layer 226 to download the MMS content 300, as indicated by step M (336). The platform layer 226, in turn, can request the delivery management app 226 (e.g., carrier app) to handle the download of the MMS message 300, as indicated by step N (338). The delivery management app 228 can request the MMS message 300 from the messaging system 202, such as over an IP connection with the MMS server 204, as indicated by step O (340). The request for the MMS message 300 can include a unique identifier (globally unique, unique with regard to the messaging system 202, unique with regard to interactions between the messaging system 202 and the client device 210, unique with regard to interactions between the sender 212 and the client device 210, or any combination thereof) to identify the MMS message 300. Such a unique identifier can, in whole or in part, be included in the SMS message 308 that is generated by the messaging system 202 and transmitted to the client device 210, can be inserted into the WAP push 328 by the delivery management app 228, and can be included as part of the request for the MMS message 300 from the messaging system 202. For example, the unique identifier can be an alphanumeric value that, by itself, uniquely identifies the MMS message 300 on the messaging system 202 that is inserted into the SMS message 308. In another example, the unique identifier can be part of a unique identifier that, in combination with information uniquely identifying the client device 210 (e.g., telephone number (or other unique identifier) for the client device 210), uniquely identifies the MMS message 300 on the messaging system 202.

Figure 3E:
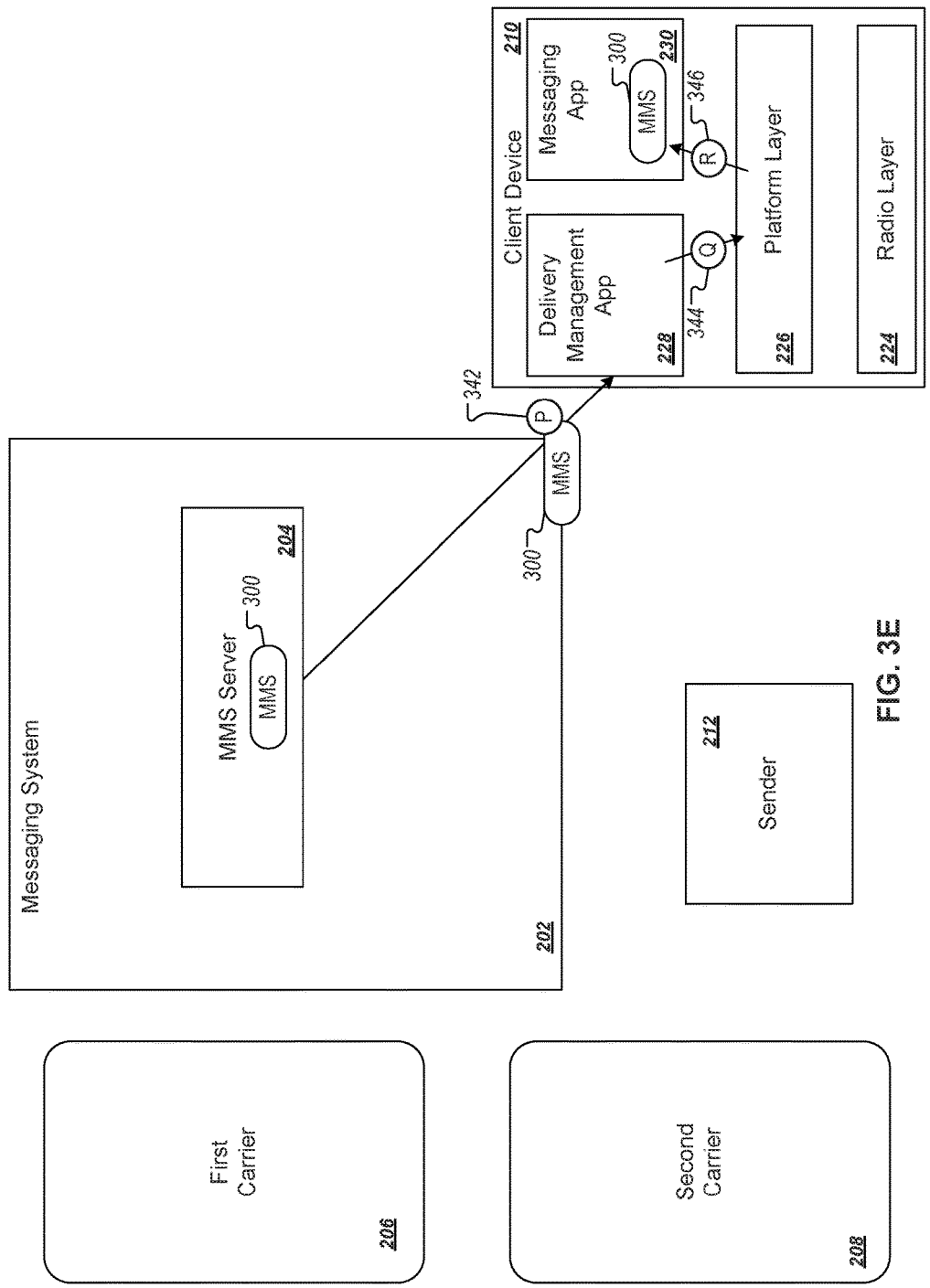

Referring to FIG. 3E, the MMS server 204 can transmit the MMS message 300 to the client device 210 and the delivery management app 228, as indicated by step P (342). The delivery management app 228 can inject the downloaded MMS message 300 into the platform layer 226, as indicated by step Q (344), which then pushes the MMS message 300 to the messaging app 230 (e.g., default SMS/MMS app), as indicated by step R (346). Once received by the messaging app 230, the MMS message 300 can be output by the client device 210 (e.g., displayed by the client device 210, transmitted by the client device 210 to an accessory device, like a smartwatch or media player).

Figure 4:
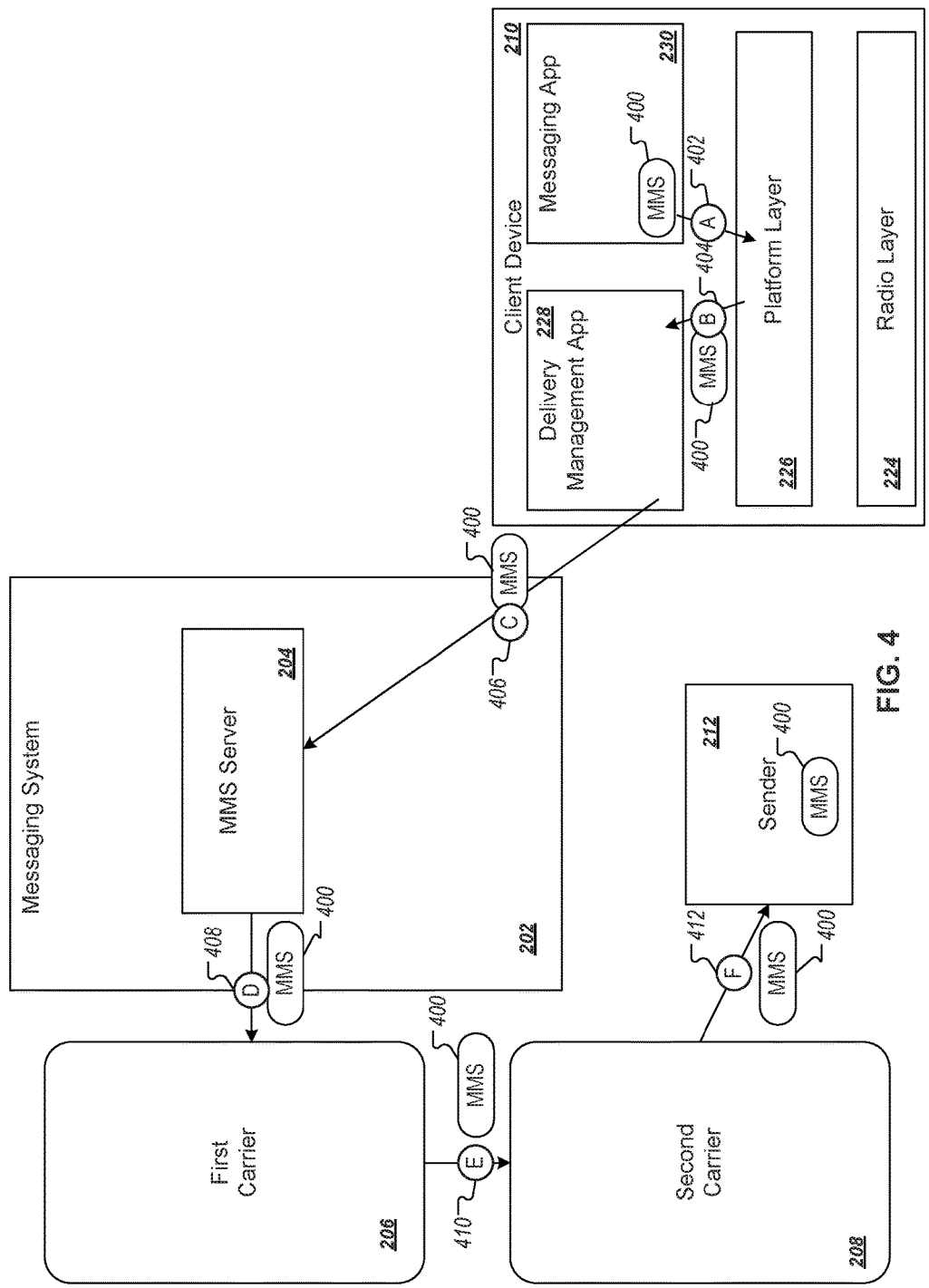
FIG. 4 depicts transmission of an outbound MMS message by the client device using the example system described in FIG. 2.

FIG. 4 depicts transmission of an outbound MMS message 400 by the client device 210 using the example system described in FIG. 2. The messaging app 230 can receive user input through a user interface on the client device 210 to transmit an MMS message 400 to the other client device 212 (identified as the "sender," but in this example the device 212 is the recipient of the MMS message 400). For example, the MMS message 400 can be transmitted in response to the MMS message 300 received through the technique depicted in FIGS. 3A-E.

In response to receiving the user input (or other instructions to transmit the MMS message 400, such as commands from other applications on the client device 410), the messaging app 230 can insert the MMS message 400 into the platform layer 226, as indicated by step A (402). The platform layer 226 can call the delivery management app 228 (e.g., carrier app) to send the MMS message 400, as indicated by step B (404). The delivery management app 228 can upload the MMS message 400 to the messaging system 202 over an IP connection (e.g., IP network 312), as indicated by step C (406), which can forward the message 400 through the first carrier 206 and the second carriers 208, as indicted by steps D and E (408, 410), and onto the sender device 212, as indicated by step F (412).

Figure 5A:
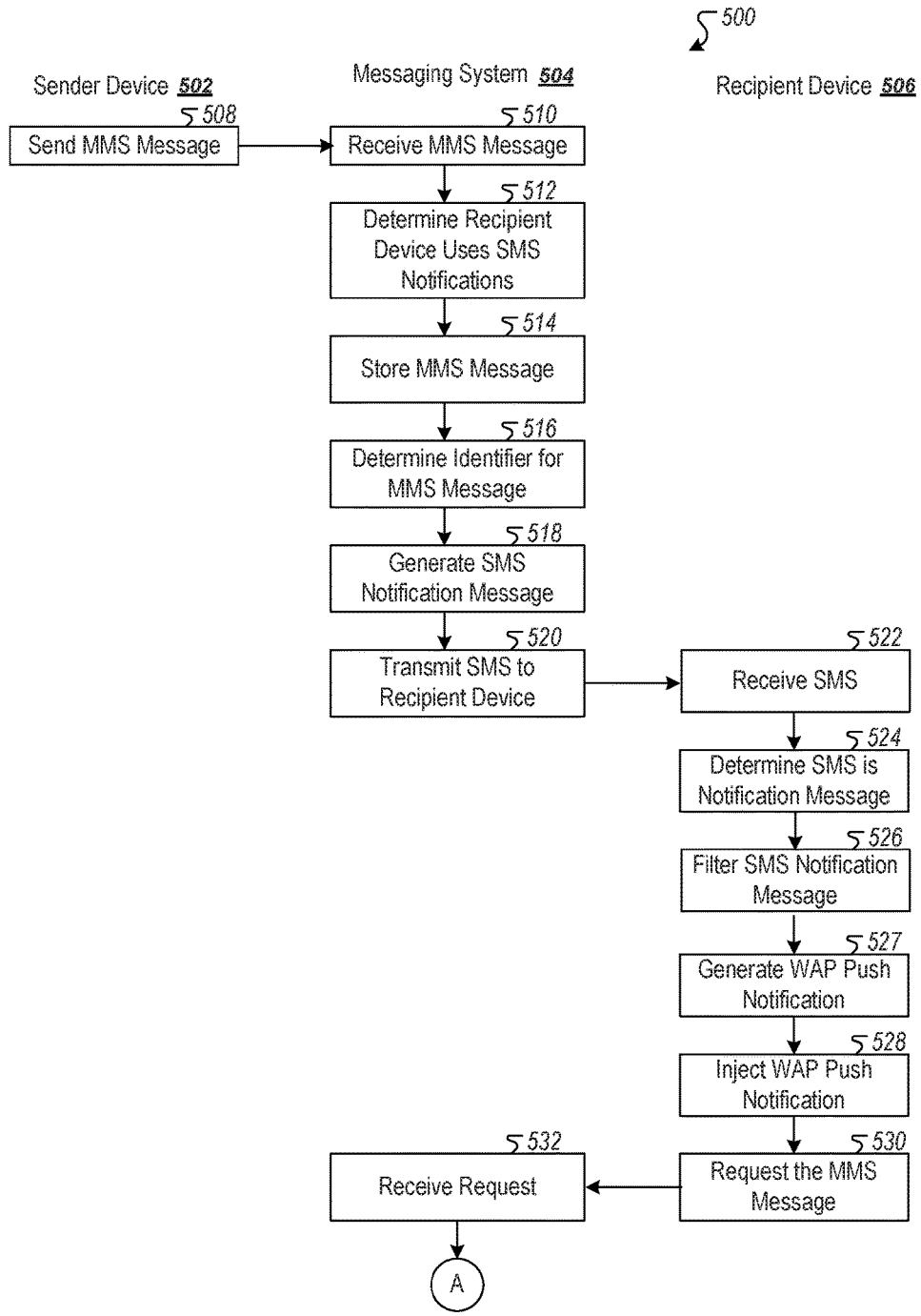
FIGS. 5A-B are flow charts of an example technique for transmitting an MMS message using SMS notifications.
Figure 5B:
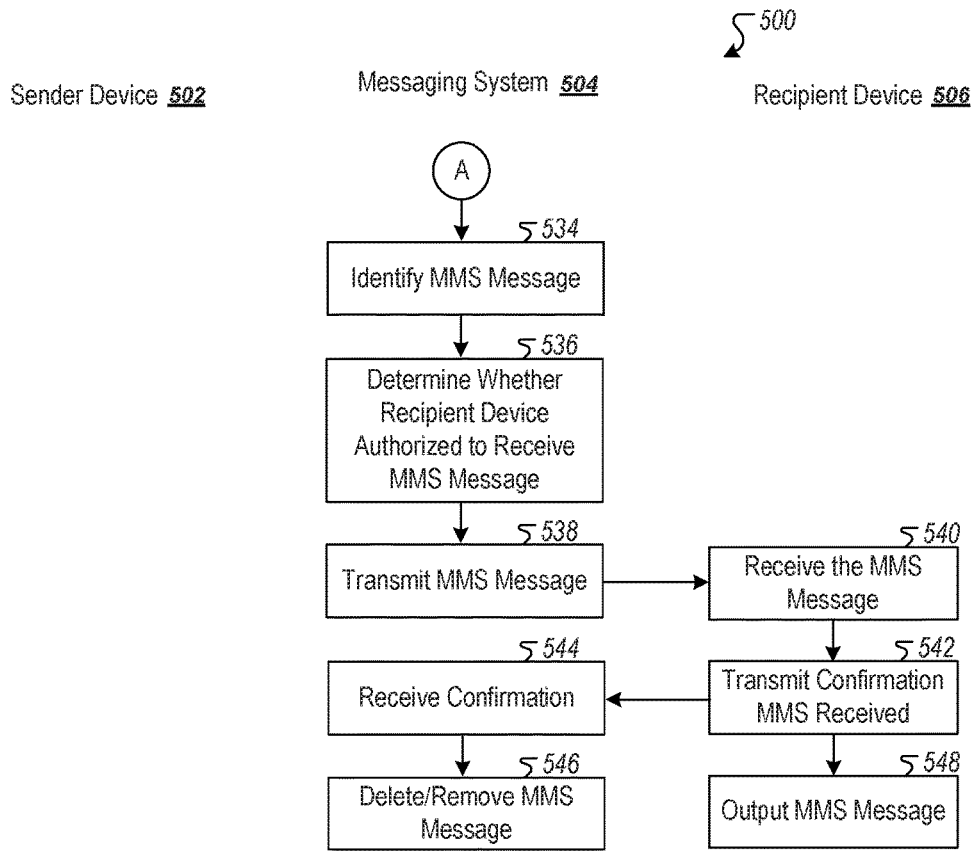

FIGS. 5A-B are flow charts of an example technique 500 for transmitting an MMS message using SMS notifications. The example technique 500 is depicted as being performed by an example sender device 502, an example messaging system 504, and an example recipient device 506. The sender device 502 can be any of a variety of appropriate computing devices, such as the mobile computing device 102, the sender device 212, and/or other appropriate computing devices. The messaging system 504 can be any of a variety of appropriate messaging computer systems or computer systems, such as the messaging system 110, the messaging system 202, and/or other appropriate messaging computer system. The recipient device 506 can be any of a variety of appropriate computing devices, such as the mobile computing device 104, the client device 210, and/or other appropriate computing devices.

Referring to FIG. 5A, the sender device 502 can send an MMS message intended for delivery to (addressed to) the recipient device 506 (508), and the MMS message can be received by the messaging system 504 (510). For example, the MMS message 300 can be sent by the sender 212 and received by the messaging system 202 through steps A-C (302-306).

The messaging system 504 can determine that the MMS message is intended for the recipient device 506 (e.g., extract the telephone number (and/or other unique identifier) for the recipient device 506 from the header of the MMS message) and can determine whether the recipient device 506 uses SMS notifications (512). For example, the messaging system 504 can reference a database identifying device configurations, such as information identifying which devices served by the messaging system 504 have installed an application and/or use an API that is programmed to intercept SMS messages with MMS notifications (e.g., delivery management app 228). If the messaging system 504 determines that the recipient device does not use SMS notifications, then the messaging system 504 can simply transmit the MMS message to the recipient device using traditional transmission techniques (e.g., transmitting a WAP push to the recipient device 506). For instance, if the recipient device 506 is not programmed to intercept and use SMS-based MMS notifications and the messaging system 504 were to transmit such an SMS message to the recipient device 506, the SMS-based notification message could be delivered to and output by a messaging app on the recipient device 506. This may be confusing to a user and also would not trigger the client device 210 to request the MMS message from the messaging system 504. In contrast, if the recipient device 506 is determined to use SMS-based notifications, then the messaging system 504 can continue with the technique 500.

The messaging system 504 can store the MMS message (514) and determine an identifier for the MMS message (516). For example, the messaging system 504 can store the MMS message for subsequent retrieval by the recipient device 506. The identifier can uniquely identify the MMS message. For example, the messaging system 504 can generate an identifier for the MMS message that is unique across all MMS messages hosted/served by the messaging system 504. The messaging system 504 may use one or more portions of the MMS message's header as part of the unique identifier, such as the sender and/or recipient fields. For example, the messaging system 504 can generate a unique identifier for MMS messages sent to and/or received from the recipient device 506, which can be appended to the recipient field (e.g., telephone number of the recipient device 506) to generate a unique identifier for the MMS message on the messaging system 504. Using such a technique to designate a unique identifier can provide advantages, such as reducing an amount of data that is transmitted with the SMS message to uniquely identify the MMS message.

The messaging system 504 can generate an SMS message that includes a notification to alert the recipient device 506 about the MMS message (518). For example, instead of generating a special SMS message, like a WAP push message, at the messaging system 504, the messaging system 504 can create a regular SMS message that includes one or more special encodings that will identify it (the regular SMS message) as a notification for an MMS message. Such encodings can include, for example, content that is included in the header and/or payload of a regular SMS message, such as a particular string of characters. The regular SMS message can additionally include the identifier determined at step 516, which may be included in the header and/or payload of the SMS message.

Once the SMS message has been generated, the messaging system 504 can transmit it to the recipient device 506 (520). The message can be transmitted, for example, over an IP network, a PSTN, and/or other available communication channels with the recipient device 506. The messaging system 504 can be programmed to repeatedly attempt delivery of the SMS message. For example, the messaging system 504 may transmit the SMS message at periodic intervals (e.g., one an hour, one per day, once per week) until the recipient device 506 responds. The SMS message can be transmitted over the same or different communication channel at each iteration.

The recipient device 506 can receive the SMS message (522) and can analyze it to determine whether it is a notification that an MMS message is available for download (524). For example, the recipient device 506 can include a delivery management app (e.g., delivery management app 228) that analyzes incoming SMS messages from the messaging system 504 to determine whether they contain one or more particular encodings indicating that they are a notification message. If the SMS message is determined to not be a notification message, then it can be handled as a normal SMS message (not a notification message), which can include, for example, the delivery management app 228 inserting the SMS message into the platform layer 226 so that it is picked up by the messaging app 230. If, instead, the SMS message is determined to be a notification message (e.g., one or more particular encodings are identified in the SMS message), then the SMS message can be intercepted by the recipient device 506 (e.g., not inserted into the platform layer 226) and processed according to the technique 500.

The recipient device 506 can filter the SMS notification message to eliminate duplicates (526). For example, the messaging system 504 can attempt redundant delivery of the SMS-based notification over multiple different communication channels, such as over an IP network and one or more carrier networks. Accordingly, multiple instances of the SMS-based notification can be received by the recipient device 506, which can apply a filter to de-duplicate received SMS-based notifications (e.g., remove/delete all duplicate SMS-based notifications received by the recipient device 506). This can allow for a more robust system for delivering MMS messages that can use multiple different communication channels, such as over IP and multiple carrier networks.

The recipient device 506 can generate, on the client-side, a WAP push notification from the SMS-based notification (527) and can inject the WAP push notification on the recipient device 506 (528). For example, the SMS message can include enough details about the MMS message (e.g., to/from information, MMS message identifier) to construct the WAP push from the device side. The device-side WAP push can be inserted into the platform layer 226, which can cause the messaging app 230 (e.g., default messaging app, SMS app, MMS app) to pick-up the device-side WAP push and to retrieve the MMS from the messaging system 202. For example, using particularly programmed MMS APIs, the platform layer 226 can request that a carrier app download the MMS message, where a non-network based authentication scheme (e.g., GAIA) can be used to authenticate the user as having access and can then manage downloading the MMS message. Such a client-created WPA push notification can also alleviate potential interoperability issues, for instance, across various carrier networks.

The client-generated and inserted WAP push notification can cause the recipient device 506 to request the MMS message from the messaging system 504 (530). Such a request can be transmitted over one or more communication networks, such as an IP network and/or a carrier network, and can include information that can be used to identify the corresponding MMS message (e.g., to and/or from fields, message identifier).

The messaging system 504 can receive the request (532) and, referring to FIG. 5B, can identify the MMS message to which the request pertains (534). For example, the messaging system 504 can determine a unique identifier for the MMS message, for example, using information included in the request (e.g., to field, from field, message identifier). The messaging system 504 can determine whether the recipient device is authorized to receive the MMS message (536). For example, the messaging system 504 can use access control lists (and/or other appropriate mechanisms to restrict access to only authorized users/devices) to determine whether the recipient device 506 is authorized to receive the MMS message. In response to determining that the recipient device 506 is authorized, the messaging system 504 can transmit the MMS message to the recipient device 506 (538). The MMS message can be transmitted over one or more communication channels, such as through an IP network and/or a carrier network.

The recipient device 506 can receive and verify the MMS message (540), and transmit confirmation that the MMS message has been received (542). The messaging system 504 can receive the confirmation (544) and, in response to receiving the confirmation, delete or otherwise remove the MMS message from its storage location on the messaging system 504 (546). The messaging system 504 can be programmed to repeatedly perform one or more of the steps 520 and 532-538 until confirmation has been received that the MMS message was delivered to the recipient device 506. Alternatively, the messaging system 504 can be programmed to delete/remove the MMS message after it has been transmitted.

Figure 6:
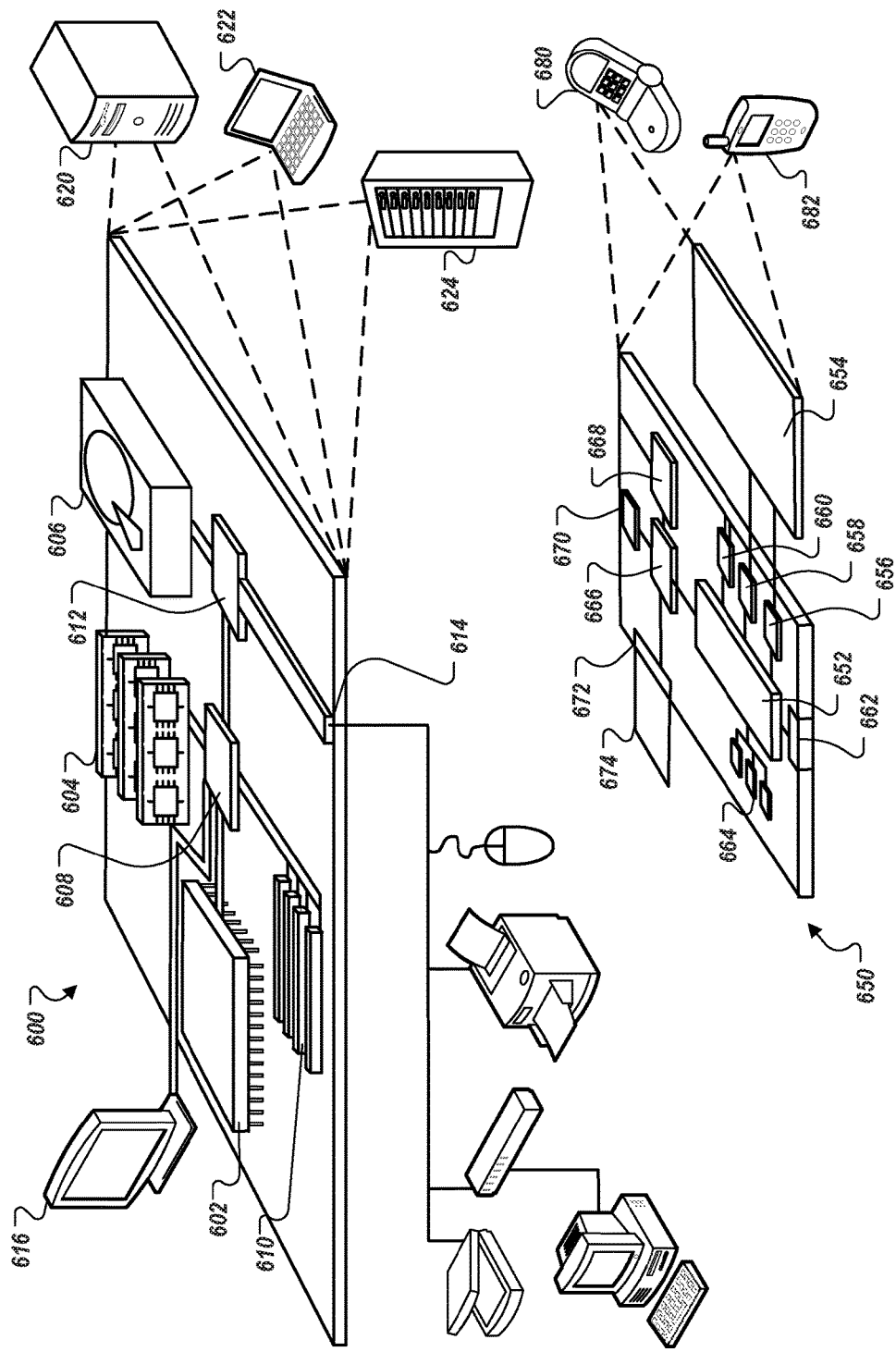
FIG. 6 is a block diagram of example computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for transmitting a multimedia message service (MMS) message using SMS-based notifications, the method comprising:
   receiving, at a computer system, the MMS message for delivery to a client computing device;
   storing, by the computer system, the MMS message;
   generating, by the computer system, a short message service (SMS) message that is not a wireless application protocol (WAP) push notification, the SMS message comprising a notification that the MMS message is available for download from the computer system;
   transmitting, by the computer system, the SMS message that is not a WAP push notification to the client computing device, the SMS message that is not a WAP push notification being configured to be intercepted by the client computing device and to cause the client computing device to: (i) generate a client-side WAP push notification for the MMS message, and (ii) inject the client-side WAP push notification for the MMS message into a platform layer on the client computing device, wherein injecting the WAP push notification into the platform layer causes a messaging application on the client computing device to request download of the MMS message;
   receiving, after transmitting the SMS message that is not a WAP push notification to the client computing device, a request from the client computing device to download the MMS message; and
   sending, by the computer system, the MMS message to the client computing device after transmitting the SMS message that is not a WAP push notification to the client computing device and without first generating or sending a WAP push notification for the MMS message to the client computing device.

2. The computer-implemented method of claim 1, wherein generating the SMS message that is not a WAP push notification comprises inserting (i) information to generate the client-side WAP push notification and (ii) a particular encoding that identifies the SMS message as the notification that the MMS message is available for download.

3. The computer-implemented method of claim 2, wherein the information comprises (i) a recipient identifier that identifies the client computing device and (ii) a sender identifier that identifies another computing device that sent the MMS message.

4. The computer-implemented method of claim 3, further comprising:
   generating, by the computer system, a message identifier for the MMS message, wherein the information further comprises the message identifier.

5. The computer-implemented method of claim 3, wherein the recipient identifier and the sender identifier comprise telephone numbers.

6. The computer-implemented method of claim 1, wherein transmitting the SMS message that is not a WAP push notification to the client computing device comprises redundant transmission of the SMS message to the client computing device.

7. The computer-implemented method of claim 6, wherein the redundant transmission of the SMS message comprises:
   transmitting, by the computer system, a first instance of the SMS message over a first communication channel; and transmitting, by the computer system, a second instance of the SMS message over a second communication channel that is different from the first communication channel.

8. The computer-implemented method of claim 7, wherein the first communication channel and the second communication channel each include one or more of the following: an internet protocol (IP) network, a public switched telephone network (PSTN), and a telecommunication carrier network.

9. The computer-implemented method of claim 1, further comprising:
   determining, by the computer system, whether the client computing device is authorized to access the MMS message in response to receiving the request from the client computing device to download the MMS message;
   wherein the MMS message is sent to the client computing device in response to determining that the client computing device is authorized to access the MMS message.

10. A computer system for transmitting a multimedia message service (MMS) message using SMS-based notifications, the system comprising:
   one or more processors;
   one or more storage devices storing instructions that, when executed by, cause the one or more processors to perform operations comprising:
      receiving a multimedia message service (MMS) message for delivery to a client computing device;
      storing the MMS message;
      generating a short message service (SMS) message that is not a wireless application protocol (WAP) push notification, the SMS message comprising a notification that the MMS message is available for download from the computer system;
      transmitting the SMS message that is not a WAP push notification to the client computing device, the SMS message that is not a WAP push notification being configured to be intercepted by the client computing device and to cause the client computing device to: (i) generate a client-side WAP push notification for the MMS message, and (ii) inject the client-side WAP push notification for the MMS message into a platform layer on the client computing device, wherein injecting the WAP push notification into the platform layer causes a messaging application on the client computing device to request download of the MMS message;
      receiving, after transmitting the SMS message that is not a WAP push notification to the client computing device, a request from the client computing device to download the MMS message; and
      sending the MMS message to the client computing device after transmitting the SMS message that is not a WAP push notification to the client computing device and without first generating or sending a WAP push notification for the MMS message to the client computing device.

11. The computer system of claim 10, wherein generating the SMS message that is not a WAP push notification comprises inserting (i) information to generate the client-side WAP push notification and (ii) a particular encoding that identifies the SMS message as the notification that the MMS message is available for download.

12. The computer system of claim 10, wherein transmitting the SMS message that is not a WAP push notification to the client computing device comprises redundant transmission of the SMS message to the client computing device.

13. The computer system of claim 12, wherein the redundant transmission of the SMS message comprises:
   transmitting a first instance of the SMS message over a first communication channel; and
   transmitting a second instance of the SMS message over a second communication channel that is different from the first communication channel.

14. The computer system of claim 10, wherein the first communication channel and the second communication channel each include one or more of the following: an internet protocol (IP) network, a public switched telephone network (PSTN), and a telecommunication carrier network.

15. A computer-implemented method comprising:
   receiving, at a client computing device, a first SMS message that is not a wireless application protocol (WAP) push notification from a messaging system;
   determining, by the client computing device, that the first SMS message that is not a WAP push notification comprises a notification that an MMS message is available for the client computing device;
   generating, by the client computing device and in response to the determining, a WAP push notification that identifies the MMS message;
   injecting, by the client computing device, the WAP push notification that identifies the MMS message into a platform layer on the client computing device, wherein injecting the WAP push notification causes a messaging application on the client computing device to request download of the MMS message;
   requesting, in response to the messaging application requesting download of the MMS message, the MMS message from the messaging system; and
   receiving, at the client computing device, the MMS message.

16. The computer-implemented method of claim 15, wherein:
   the client computing device receives the MMS message from the messaging system after receiving the first SMS message that is not a WAP push notification and without having first received a server-side WAP push notification for the MMS message from the messaging system, and
   the first SMS message is intercepted by the client computing device so as to not be accessible to the messaging application.

17. The computer-implemented method of claim 15, further comprising:
   receiving, at the client computing device, a second SMS message that is not a WAP push notification from the messaging system;
   determining, by the client computing device, that the second SMS message that is not a WAP push notification also comprises the notification that the MMS message is available for the client computing device;
   determining, by the client computing device, that the second SMS message is a duplicate of the first SMS message providing notification about the MMS message; and
   deleting, by the client computing device, the second SMS message in response to determining that the second SMS message is a duplicate of the first SMS message.

18. The computer-implemented method of claim 17, wherein the first SMS message and the second SMS message are received over different communication channels.

* * * * *

UNITED STATES PATENT AND TRADEMARK OFFICE
CERTIFICATE OF CORRECTION

PATENT NO. : 10,206,071 B2  
APPLICATION NO. : 15/160450  
DATED : February 12, 2019  
INVENTOR(S) : Rowny et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 100 days.

Signed and Sealed this  
Twenty-seventh Day of August, 2019

Andrei Iancu  
*Director of the United States Patent and Trademark Office*